UNITED STATES PATENT OFFICE.

AUGUST PROPFE, OF PHILADELPHIA, PENNSYLVANIA.

COMPOSITION FOR SEALING FRUIT-CANS.

SPECIFICATION forming part of Letters Patent No. 636,922, dated November 14, 1899.

Application filed September 9, 1899. Serial No. 729,948. (No specimens.)

*To all whom it may concern:*

Be it known that I, AUGUST PROPFE, a citizen of the United States, residing in the city of Philadelphia, State of Pennsylvania, have invented a certain new and useful Improved Composition of Matter to be Used for Sealing Fruit-Cans and Coating Strings, of which the following is a full, clear, and exact description.

My improved composition for said purposes consists of the following ingredients, viz.: resin, an oily substance, such as tallow or crude turpentine, the fibrous asbestos wool, and stearic acid. These are combined in or about the following proportions, viz: eighty-five pounds of resin, preferably of the variety known as "N" resin, three pounds of tallow or two pounds of crude turpentine, three pounds of asbestos wool, and four and one-half pounds of stearic acid. These ingredients are admixed and combined by melting them in a suitable vessel to which heat is applied in the usual way and thoroughly mixed therein. Preferably the resin is first melted before adding the other ingredients to save loss. The tallow or turpentine is employed for its fatty properties, so that the composition when cold, in sticks or as a coating on the strings, will be flexible and not too brittle. Hence if a high grade of resin containing much turpentine is used the tallow or additional turpentine may be dispensed with. The stearic acid is preferably in solid or cake form, in which it is commercially sold.

The composition may be molded in cooling, and thereby formed into sticks to be used in sealing fruit-cans; but the proportions stated above of said ingredients make the resultant composition best adapted to be used as a coating for strings employed for sealing cans in a manner now commonly practiced and as described in United States Patent to Hunsaker, No. 235,879, dated December 28, 1880.

The proportions above stated of my composition may be varied slightly without changing the nature and properties thereof. For illustration, if a stiffer composition is required to be molded into sticks less stearic acid is employed.

I am aware of the Patent No. 288,525 to Waterous and No. 307,746 to Coddington for a sealing composition for like purposes; but my composition differs radically from both in that the distinguishing novel feature of the former was the inclusion of steatite or soapstone with resin and tallow formerly employed, and the distinguishing and only novel feature of the Coddington composition was asbestos or agatite when employed in a finely-ground state or cotton or hemp fiber in a like ground state. I employ in my composition the greasy fibrous strands of asbestos commercially known as "asbestos wool," being the strands separated from the mineral portion of the asbestos stone or powder, and I employ also stearic acid which is an excellent binder and has a chemical effect, apparently, on the resin, tallow, and asbestos fiber, particularly the former, which gives a resultant composition having properties peculiarly its own and which is well adapted to the coating of strings for the purpose hereinbefore stated.

Having thus described my invention, I claim—

1. A composition for sealing fruit-cans and coating strings, composed of resin, an oily substance, fibers of asbestos wool, and stearic acid; substantially as described.

2. A composition for sealing fruit-cans and coating strings, composed of resin containing free turpentine, fibers of asbestos wool, and stearic acid; substantially as described.

3. A composition for coating strings &c. composed of resin, tallow, fibers of asbestos wool separated from the powdered stone, and stearic acid, admixed in the proportions substantially as specified.

In testimony whereof I have hereunto affixed my signature this 7th day of September, A. D. 1899.

AUGUST PROPFE.

Witnesses:
ANDREW V. GROUPE,
H. T. FENTON.